US012019447B2

(12) United States Patent
Xia et al.

(10) Patent No.: US 12,019,447 B2
(45) Date of Patent: Jun. 25, 2024

(54) METHOD AND APPARATUS FOR TRAJECTORY PLANNING, STORAGE MEDIUM, AND ELECTRONIC DEVICE

(71) Applicant: Beijing Sankuai Online Technology Co., Ltd., Beijing (CN)

(72) Inventors: Huaxia Xia, Beijing (CN); Guosheng Chen, Beijing (CN); Run Tian, Beijing (CN); Xuetao Xing, Beijing (CN); Zhichao Wang, Beijing (CN); Hongshuai Chen, Beijing (CN); Yangyu Zhang, Beijing (CN); Shitao Yan, Beijing (CN); Dongchun Ren, Beijing (CN); Mingyu Fan, Beijing (CN)

(73) Assignee: Beijing Sankuai Online Technology Co., Ltd., Beijing (CN)

( * ) Notice: Subject to any disclaimer, the term of this patent is extended or adjusted under 35 U.S.C. 154(b) by 340 days.

(21) Appl. No.: 17/667,543

(22) Filed: Feb. 9, 2022

(65) Prior Publication Data

US 2022/0357747 A1 Nov. 10, 2022

(30) Foreign Application Priority Data

May 10, 2021 (CN) .......................... 202110502885.5

(51) Int. Cl.
G05D 1/00 (2024.01)
B60W 60/00 (2020.01)

(52) U.S. Cl.
CPC ....... *G05D 1/0214* (2013.01); *B60W 60/0027* (2020.02); *B60W 2520/10* (2013.01);
(Continued)

(58) Field of Classification Search
CPC .............. G05D 1/0214; G05D 1/0223; B60W 60/0027; B60W 2520/10;
(Continued)

(56) References Cited

U.S. PATENT DOCUMENTS 9,216,745 B2 * 12/2015 Beardsley ............ G08G 5/0069
11,789,453 B2 * 10/2023 Chowdhary ............ G06T 7/155
382/110
(Continued)

FOREIGN PATENT DOCUMENTS

CN 103854302 A 6/2014
CN 104165627 A 11/2014
(Continued)

OTHER PUBLICATIONS

State Intellectual Property Office of the People's Republic of China, Office Action and Search Report Issued in Application No. 2021105028855, Jun. 25, 2021, 19 pages. (Submitted with Machine/Partial Translation).
(Continued)

*Primary Examiner* — Peter D Nolan
*Assistant Examiner* — Ashley L Redhead, Jr.
(74) *Attorney, Agent, or Firm* — Kilpatrick Townsend & Stockton LLP

(57) ABSTRACT

A method for trajectory planning, an apparatus, a storage medium, and an electronic device are provided. A constraint set of a space including a target device is determined according to a velocity of an unmanned device and velocities of designated obstacles, so that during optimization of a preliminary reference trajectory, a solution can be obtained with the space in the constraint set as a solution space under the constraint of the constraint set, so as to ensure that the solution space is a convex space, and relatively satisfactory reference trajectory points can be solved.

15 Claims, 6 Drawing Sheets

(52) U.S. Cl.
CPC .............. *B60W 2554/4042* (2020.02); *B60W 2554/802* (2020.02); *B60W 2554/804* (2020.02)

(58) Field of Classification Search
CPC ... B60W 2554/4042; B60W 2554/802; B60W 2554/804; G01C 21/3407
See application file for complete search history.

(56) References Cited

U.S. PATENT DOCUMENTS

| | | | |
|---|---|---|---|
| 2019/0187703 A1 | 6/2019 | Millard et al. | |
| 2021/0354729 A1* | 11/2021 | Ng | B60W 60/0018 |
| 2022/0219682 A1* | 7/2022 | Ollis | B60W 30/0956 |
| 2022/0219727 A1* | 7/2022 | Floor | B60W 30/095 |
| 2022/0250641 A1* | 8/2022 | Seegmiller | G01C 21/3407 |
| 2022/0283587 A1* | 9/2022 | Kabzan | B60W 40/105 |
| 2022/0357747 A1* | 11/2022 | Xia | G01C 21/3407 |
| 2023/0089978 A1* | 3/2023 | Pulver | G05D 1/0246 701/26 |

FOREIGN PATENT DOCUMENTS

| | | |
|---|---|---|
| CN | 108762256 A | 11/2018 |
| CN | 112179351 A | 1/2021 |
| CN | 112193244 A | 1/2021 |
| CN | 112432648 A | 3/2021 |
| CN | 112435504 A | 3/2021 |

OTHER PUBLICATIONS

Robin Deits et al, "Computing Large Convex Regions of Obstacle-Free Space through Semidefinite Programming" MIT Computer Science and Artificial Intelligence Laboratory, Cambridge, MA. Dec. 2, 1995. 16 pages.

* cited by examiner

METHOD AND APPARATUS FOR TRAJECTORY PLANNING, STORAGE MEDIUM, AND ELECTRONIC DEVICE

CROSS REFERENCE TO RELATED APPLICATIONS

The present application claims priority to Chinese Patent Application No. 202110502885.5, filed on May 10, 2021, which is incorporated herein by reference in its entirety.

TECHNICAL FIELD

This application relates to the field of computer technologies, and in particular, to a method and apparatus for trajectory planning, a storage medium, and an electronic device.

BACKGROUND

At present, when it comes to controlling an unmanned device, a reference trajectory in a time period in the future may usually be planned for the unmanned device, to guide the unmanned device to move based on the planned reference trajectory.

Because in a movement space of the unmanned device, there are obstacles other than the unmanned device. For example, there are obstacles when a driverless device travels on the road, and there are birds and other unmanned aerial vehicles when an unmanned aerial vehicle flies in the air. Therefore, when the reference trajectory is planned for the unmanned device, all obstacles need to be avoided by taking not only a movement destination of the unmanned device but also motion statuses of the obstacles into consideration.

Usually, movement trajectories of the obstacles in a time period in the future are predicted, and when the reference trajectory of the unmanned device is planned, a preliminary reference trajectory that is pre-determined is optimized with avoiding the unmanned device from colliding with the obstacles as a goal, so as to obtain the reference trajectory of the unmanned device Therefore, it can be considered that a solution space in the optimization process is positions, other than the space occupied by the obstacle, in the movement space in which the unmanned device is located.

Obviously, when there are obstacles in the movement space in which the unmanned device is located, the solution space thereof is a non-convex space. Because a local optimal solution is likely to be obtained when the preliminary reference trajectory is optimized in the non-convex space, it is difficult to obtain an ideal reference trajectory.

SUMMARY

In various embodiments, a method and apparatus for trajectory planning, a storage medium, and an electronic device are provided to address existing problems above.

The following technical solutions are described in this disclosure.

In some embodiments, a method for trajectory planning is provided. The method includes: determining a preliminary reference trajectory point of a target device and predicted trajectory points of designated obstacles at a target moment;
for each of the designated obstacles, determining a constraint boundary corresponding to the designated obstacle according to a velocity of the designated obstacle and a velocity of the target device, where the constraint boundary is configured to divide a space in which the target device and the designated obstacle are located into two disjoint parts, such that the designated obstacle is in one of the two disjoint parts and the target device is in another of the two disjoint parts;
determining a space including the target device and enclosed by constraint boundaries corresponding to at least some of the designated obstacles as a constraint set corresponding to the target moment; and
adjusting a preliminary reference trajectory of the target device under the constraint of the constraint set of the target moment, and determining the adjusted preliminary reference trajectory as a reference trajectory of the target device.

This disclosure provides an apparatus for trajectory planning, including:
a trajectory determining module, configured to determine a preliminary reference trajectory point of a target device and predicted trajectory points of designated obstacles at a target moment;
a constraint boundary determining module, configured to for each of the designated obstacles, determine a constraint boundary corresponding to the designated obstacle according to a velocity of the designated obstacle and a velocity of the target device, where the constraint boundary is configured to divide a space in which the target device and the designated obstacle are located into two disjoint parts, such that the designated obstacle is in one of the two disjoint parts and the target device is in another of the two disjoint parts;
a constraint set determining module, configured to determine a space including the target device and enclosed by constraint boundaries corresponding to at least some of the designated obstacles as a constraint set corresponding to the target moment; and
a trajectory adjusting module, configured to adjust a preliminary reference trajectory of the target device under the constraint of the constraint set of the target moment, and determining the adjusted preliminary reference trajectory as a reference trajectory of the target device.

This disclosure provides a computer-readable storage medium, storing a computer program, when executed by a processor, the computer program implementing the foregoing method for trajectory planning.

This disclosure provides an unmanned device, including a memory, a processor, and a computer program stored on the memory and executable on the processor, when executing the program, the processor implementing the foregoing method for trajectory planning.

At least one technical solution adopted in this disclosure can achieve the following beneficial effects.

In the method for trajectory planning according to this disclosure, a constraint set of a space including the target device is determined according to a velocity of the unmanned device and a velocity of the designated obstacle, so that during optimization of a preliminary reference trajectory, a solution can be obtained with the space in the constraint set as a solution space under the constraint of the constraint set, so as to ensure that the solution space is a convex space, and relatively satisfactory reference trajectory points can be solved.

BRIEF DESCRIPTION OF DRAWINGS

Accompanying drawings described herein are used for providing further understanding about this disclosure, and constitute a part of this disclosure. Exemplary embodiments of this disclosure and descriptions thereof are used for explaining this disclosure, and do not constitute an inappropriate limitation on this disclosure. In the accompanying drawings.

DETAILED DESCRIPTION

Figure 1:
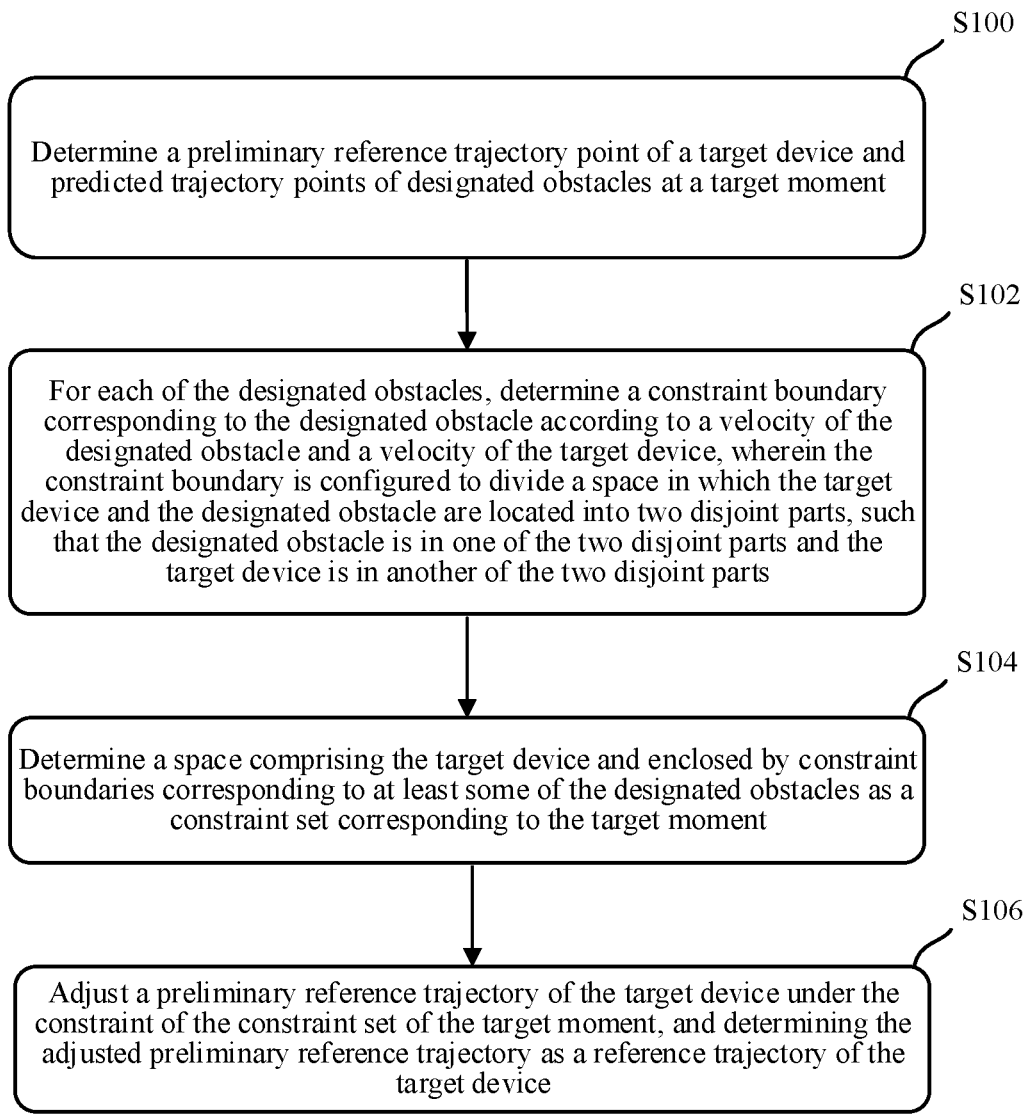
FIG. 1 is a schematic flowchart of a method for trajectory planning in this disclosure.

When problems to be resolved through optimization are faced, a variable to be optimized is usually solved by approximating an objective function. For example, when a camera is calibrated, a parameter of the camera is a variable to be optimized, and an objective function thereof is differences between two-dimensional coordinates calculated by mapping three-dimensional coordinates in a real space to an imaging plane using the parameter and two-dimensional coordinates actually corresponding to the three-dimensional coordinates. It can be seen that the process of adjusting the variable toward to the optimal direction of the objective function (when the camera is calibrated, the optimal direction of the objective function is the smallest distance between the calculated two-dimensional coordinates and the two-dimensional coordinates measured actually) is an optimization process. A definition domain pre-determined for the to-be-optimized variable is a constraint range of the variable.

When the variable is optimized based on an initial value, if the objective function and a constraint function are both convex functions, the optimization can be referred to as convex optimization. Compared with non-convex optimization, the convex optimization is less likely to arrive at a local optimal solution, and is more likely to arrive at an ideal optimization result.

In some problems addressed by this disclosure, a preliminary reference trajectory is pre-determined for a target device. In this case, the preliminary reference trajectory is to be adjusted. In this case, the preliminary reference trajectory is the variable to be optimized in accordance with this disclosure, and a space in which the target device can move is the constraint range in this disclosure.

Further, when the constraint range of the target device is a convex set, the optimization process of the preliminary reference trajectory in this disclosure is a convex optimization process. A person skilled in the art knows that straight lines between any two points included in the convex set are all inside the convex set.

Based on an understanding of the foregoing problems, this disclosure provides a method for trajectory planning, to determine a constraint set of a space including an unmanned device based on velocities of the unmanned device and a designated obstacle, so that when a preliminary reference trajectory is optimized, a solution is obtained by using the constraint set serving as a convex set as the constraint range for the optimization.

To state the objectives, technical solutions, and advantages of this disclosure, the technical solutions of this disclosure will be described below with reference to specific embodiments of this disclosure and corresponding accompanying drawings. Apparently, the described embodiments are merely some but not all of the embodiments, and thus are thus not intended to limit this disclosure. Based on the embodiments of this disclosure, all other embodiments obtained by a person of ordinary skill in the art without creative efforts shall fall within the protection scope of this disclosure.

The technical solutions provided in the embodiments of this disclosure are described in detail below with reference to the accompanying drawings.

FIG. 1 is a schematic flowchart of a method for trajectory planning in this disclosure. The method for trajectory planning specifically includes the following steps:

S100: Determine a preliminary reference trajectory point of a target device and predicted trajectory points of designated obstacles at a target moment.

The target device described in this disclosure is an unmanned device. A reference trajectory planned in the method for trajectory planning according to this disclosure is used for controlling the target device, so as to guide the target device to move according to the reference trajectory. In the embodiments of this disclosure, the method for trajectory planning according to this disclosure may be executed by the target device, such as a driverless device or an unmanned aerial vehicle, or may be executed by a server or another electronic device that can transmit information to the target device and control the target device, which is not limited in this disclosure. For ease of description, in this disclosure, the method for trajectory planning provided in this disclosure is described by using an example in which the method for trajectory planning is executed by the target device.

The target device in the embodiments in accordance with this disclosure may include an unmanned device moving on a plane and an unmanned device moving in a three-dimensional space. The unmanned device moving on a plane does not mean that the movement space of the unmanned device is two-dimensional, and instead, means that when the unmanned device moves in its own inherent motion mode, the unmanned device can only move based on one specific plane. For example, a car can only move on a plane in which a road is located.

For brevity, in this disclosure, that the target device is a driverless device that only moves on a plane in which a road is located (hereinafter referred to as an unmanned vehicle) is used as an example below, to explain the method for trajectory planning according to this disclosure. The unmanned device moving in a three-dimensional space (hereinafter referred to as an unmanned aerial vehicle) needs to be explained when corresponding steps are executed in other ways.

It should be noted that when the target device described in this disclosure is an unmanned vehicle, the unmanned vehicle may include an autonomous vehicle and vehicle with a driver assistance function. The unmanned vehicle may be a delivery vehicle applied to the field of delivery. When the target device in this disclosure is an unmanned aerial vehicle, the unmanned aerial vehicle may be a delivery unmanned aerial vehicle applied to the field of delivery, for example, applied to takeaway delivery.

Obstacles in a perception range of the unmanned vehicle are used as designated obstacles described in this disclosure. However, generally, when a trajectory is planned for the unmanned vehicle, the obstacles generally considered are obstacles located around the location of the unmanned vehicle, such as obstacles that are 20 meters away from the unmanned vehicle. In an embodiment of this disclosure, obstacles that meet a first distance condition are selected from the obstacles perceived by the unmanned vehicle based on a preliminary reference trajectory point of the unmanned vehicle. The obstacles that meet the first distance condition are obstacles of which distances between predicted trajectory points and the preliminary reference trajectory point of the target device are less than a predetermined first distance. The obstacles that meet the first distance condition are the designated obstacle described in this disclosure. Certainly, any distance may be considered as the foregoing first distance. Because a traveling direction of the unmanned vehicle is known, only obstacles in the traveling direction (such as obstacles in front of the unmanned vehicle) of the unmanned vehicle are considered, and obstacles in the environment in which the unmanned vehicle is located may alternatively be considered the designated obstacles described in this disclosure, for example, obstacles on the same road as the unmanned vehicle. It can be seen that there are many ways to select the designated obstacles, which is not limited in this disclosure.

Similarly, when the target device is an unmanned aerial vehicle, obstacles around a location of the unmanned aerial vehicle may be considered. However, because the unmanned aerial vehicle flies at a specific height, when the target device is an unmanned aerial vehicle, an obstacle of which a height is greater than a predetermined height distance threshold from the unmanned aerial vehicle may not be considered.

Traveling data of the designated obstacles around the unmanned vehicle is collected through sensors installed on the unmanned vehicle. The traveling data may include inherent attributes of the designated obstacles (for example, the shapes and volumes), and information, such as coordinates, times, and velocities, about movements within a time period in the past, which is not limited in this disclosure. When the method for trajectory planning described in this disclosure is performed, movements of all the designated obstacle need to be predicted first based on the collected traveling data of the designated obstacles, to obtain the predicted trajectory points of the designated obstacles at a target moment, that is, predicted trajectory points. In addition, the preliminary reference trajectory point for the unmanned vehicle at the target moment also needs to be determined based on a traveling destination of the unmanned vehicle.

In the embodiments in accordance with this disclosure, the predicted trajectory point predicted for the designated obstacle may not only include a location of the designated obstacle at the target moment, but also include a motion status, for example, the velocity (the magnitude and direction), of the designated obstacle at the target moment. Similarly, the preliminary reference trajectory point determined for the unmanned vehicle at the target moment may further include a motion status of the unmanned vehicle at the target moment. The specific data included in the motion status is not limited in this disclosure.

It should be noted that in the embodiments of this disclosure, the target moment is a future moment compared to the current moment. In the embodiments of this disclosure, a preliminary reference trajectory point at each future moment within a first predetermined duration in the future is determined for the unmanned vehicle, and predicted trajectory points at each future moment within a second predetermined duration in the future are predicted for the designated obstacles. The first predetermined duration and the second predetermined duration may be the same or different. The following of this disclosure is described by using an example in which the first predetermined duration and the second predetermined duration are the same, that is, the predicted trajectory points predicted for the designated obstacles may alternatively be a predicted trajectory points of the designated obstacles at each future moment within the first predetermined duration in the future. In an embodiment of this disclosure, an interval between every two adjacent future moments may be the same duration.

Each future moment may be used as the target moment described in this disclosure.

It should be understood by a person skilled in the art that a preliminary reference trajectory formed by preliminary reference trajectory points may not directly guide traveling of the unmanned vehicle, but serves as an optimization basis for reference trajectory points. In other words, a reference trajectory formed by the reference trajectory points obtained after optimization of the preliminary reference trajectory points is a trajectory that guides the traveling of the unmanned vehicle.

S102: for each of the designated obstacles, determine a constraint boundary corresponding to the designated obstacle according to a velocity of the designated obstacle and a velocity of the target device, where the constraint boundary is configured to divide a space in which the target device and the designated obstacle are located into two disjoint parts, such that the designated obstacle is in one of the two disjoint parts and the target device is in another of the two disjoint parts.

It should be understood that movement trends of the designated obstacles and the unmanned vehicle may be reflected by their velocities. Therefore, in the embodiments of this disclosure, a constraint boundary corresponding to designated obstacle may be determined for each designated obstacle based on the velocity of the designated obstacle and the velocity of the target device, so that the reference trajectory points of the target device optimized under the constraint of the constraint boundary may avoid collision with the designated obstacle.

When the target device is an unmanned vehicle, it can be considered that the unmanned vehicle moves on a road, that is, a two-dimensional plane. Therefore, a space of the two-dimensional plane, that is, the road, may be considered as a solution space for optimizing the preliminary reference trajectory points of the unmanned vehicle. In the embodiments of this disclosure, a manner of determining a constraint boundary provided in this disclosure is described by using an example in which the solution space for optimizing the preliminary reference trajectory points of the unmanned vehicle is to two-dimensional plane space, describes a constraint boundary determination manner provided in this disclosure, and explanations are made when the target device of which a movement space is a three-dimensional space needs to perform corresponding steps in other manners.

Figure 2A:
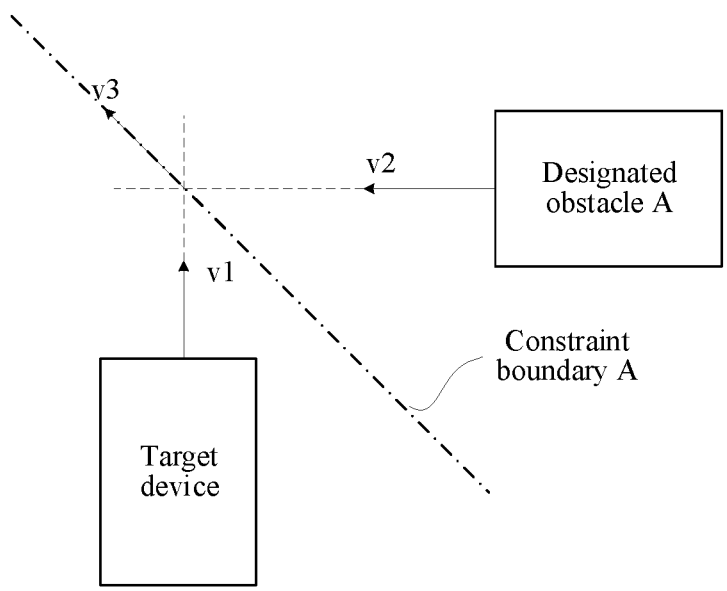
FIG. 2A and FIG. 2B are schematic diagrams of two constraint boundaries according to this disclosure.

Manner 1: A straight line that has a same slope as a relative velocity direction may be determined as a constraint boundary corresponding to a designated obstacle based on the relative velocity direction between a target device and the designated obstacle. As shown in FIG. 2A, movement velocities of the target device and a designated obstacle A at a target moment are $v_1$ and $v_2$, and a relative movement velocity thereof is $v_3$. In this case, a straight-line constraint boundary A that has a same slope as $v_3$ based on a direction of $v_3$. It should be noted that the constraint boundary A can divide a two-dimensional plane space in which the target device and the designated obstacle are located into two disjoint two-dimensional spaces respectively including the target device located at the preliminary reference trajectory point and the designated obstacle located at the predicted trajectory point.

Figure 2B:
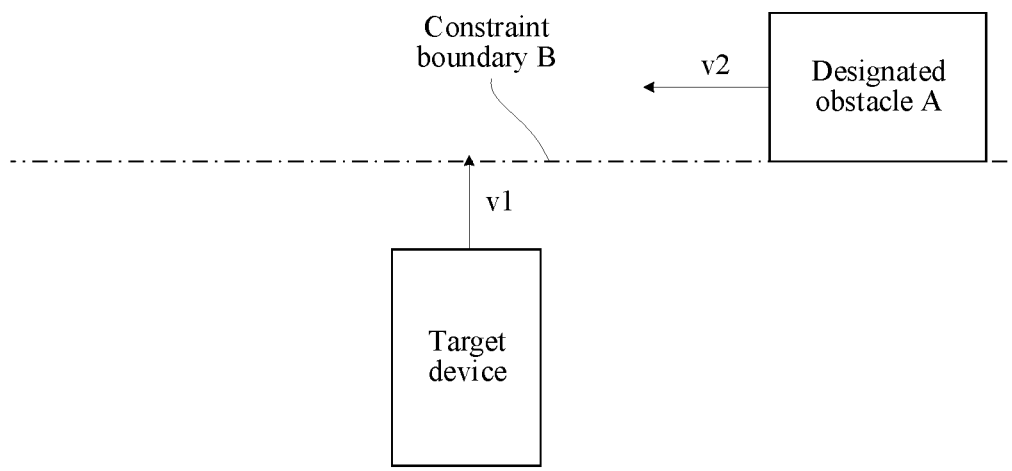

Manner 2: A straight line that has a same slope with a velocity of a designated obstacle may be determined only based on the velocity of the designated obstacle as a constraint boundary corresponding to the designated obstacle. Specifically, as shown in FIG. 2B, a constraint boundary B that has a same velocity direction as a velocity direction $v_2$ of a designated obstacle A may be determined as a constraint boundary corresponding to the designated obstacle A.

Manner 3: Whether a distance between a designated obstacle and a target device has a decreasing trend under the action of a relative velocity between the designated obstacle and the target device may be determined based on the relative velocity direction between the target device and the designated obstacle. If the distance has a decreasing trend, hyperplanes each with a normal vector perpendicular to a velocity direction of the designated obstacle are determined as candidate hyperplanes corresponding to the designated obstacle, and a constraint boundary corresponding to the designated obstacle is selected from the candidate hyperplanes corresponding to the designated obstacle. If the distance does not have a decreasing trend, hyperplanes each with a normal vector perpendicular to a velocity direction of the target device are determined as candidate hyperplanes corresponding to the designated obstacle, and a constraint boundary corresponding to the designated obstacle is selected from the candidate hyperplanes corresponding to the designated obstacle.

The constraint boundary corresponding to the designated obstacle may be determined in any one of the foregoing manners. The following of this disclosure is described by using the third manner as an example.

It should be noted that in any one of the constraint boundary determination manners, a target device and a designated obstacle divided by the determined corresponding constraint boundaries into a two-dimensional space are both located in the two-dimensional space in which the trajectory points are located. The target device and the designated obstacle are not divided into two disjoint two-dimensional spaces.

Obviously, when it is learned that the constraint boundary is a slope of the straight line, an infinite number of straight lines that satisfy the above conditions may be determined, and any one of the straight lines can be selected as the constraint boundary corresponding to the designated obstacle, which is not limited in this disclosure.

It should be noted that in the embodiments of this disclosure, in the embodiments of this disclosure the constraint boundary corresponding to the designated obstacle determined in any manner divides the spaces of the target device and the designated obstacle into two disjoint parts and the designated obstacle. In addition, the designated obstacle is divided by the corresponding constraint boundary into a part different from the target device. Further, all points included by the designated obstacle or the target device are divided into a same part without being cut by the constraint boundary.

Therefore, when the constraint boundary is determined in the foregoing manners, a constraint boundary that meets the condition may not be determined. Determining the constraint boundary in the manner 3 is used as an example. When the candidate hyperplanes corresponding to the designated obstacle meet the foregoing condition, the candidate hyperplanes are used as target hyperplanes of the designated obstacle, and the constraint boundary corresponding to the designated obstacle is selected from the target hyperplanes corresponding to the designated obstacle. When the candidate hyperplanes corresponding to the designated obstacle do not meet the foregoing condition, the constraint boundary corresponding to the designated obstacle may not be selected from the candidate hyperplanes, and instead, the constraint boundary corresponding to the designated obstacle may be determined based on a direction of the relative velocity between the designated obstacle and the target device. Specifically, a hyperplane with a vector perpendicular to a direction of the relative velocity between the designated obstacle and the target device is determined as a constraint boundary corresponding to the designated obstacle. The constraint boundary corresponding to the designated obstacle may alternatively be determined based on a boundary of the designated obstacle. For example, boundary points including the designated obstacle closest to the target device is determined as the constraint boundary corresponding to the designated obstacle. It can be seen that there are various manners of determining the constraint boundary, and the constraint boundary may be determined in any existing manner, which is not described below in detail in this disclosure.

Obviously, when the constraint boundary is determined for each designated obstacle, if the slope of the constraint boundary is known, an infinite number of straight lines that satisfy the above conditions can be determined as the constraint boundaries of the designated obstacle. However, in optimization, it is generally expected to obtain a solution in a relatively large solution set space. As reflected in a two-dimensional plane, constraint boundaries are determined with a goal that the constraint boundaries enclose more constraint sets when the slope is determined. In this case, distances between the candidate hyperplanes corresponding to the designated obstacle and the preliminary reference trajectory point of the target device is determined for the candidate hyperplanes based on the preliminary reference trajectory point of the target device, and a candidate hyperplane that has a longest distance to the preliminary reference trajectory point of the target device is selected as the constraint boundary corresponding to the designated obstacle from all the candidate hyperplanes corresponding to the designated obstacle. Specifically, in FIG. 3, a slope of a constraint boundary D determined for the designated obstacle is the same as a slope of movement direction of the target device. In this case, the constraint boundary D may be translated to the location in the figure, and the constraint boundary D is a candidate hyperplane that has a longest distance to the preliminary reference trajectory point of the target device.

In addition, when the target device is the unmanned aerial vehicle, a normal vector of a plane determined as a constraint boundary is perpendicular to the velocity direction that serves as the slope of the constraint boundary in the unmanned vehicle, and points to the unmanned aerial vehicle.

S104: Determine a space including the target device and enclosed by constraint boundaries corresponding to at least some of the designated obstacles as a constraint set corresponding to the target moment.

In the embodiments of this disclosure, corresponding constraint boundaries can be determined for all designated obstacles in the foregoing manners, to obtain a space including the target device and enclosed by the constraint boundaries as a constraint set corresponding to the target moment.

Figure 3:
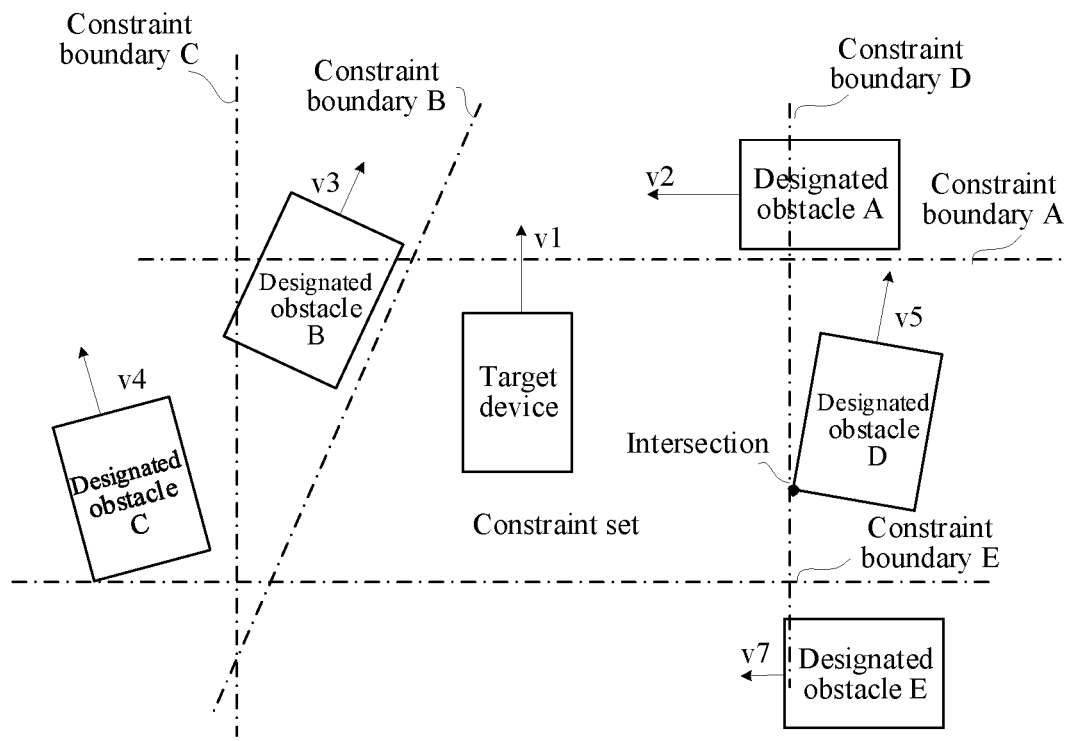
FIG. 3 is a schematic diagram of a constraint set according to this disclosure.

FIG. 3 shows a manner of determining a constraint set based on constraint boundaries. Based on the manner 3 of determining a constraint boundary, for a designated obstacle A to a designated obstacle E, a constraint boundary A to a constraint boundary E corresponding to all the designated obstacles are respectively determined. In this case, a constraint set enclosed by the constraint boundary A, the constraint boundary B, the constraint boundary D, and the constraint boundary E may be obtained as a constraint set corresponding to a target moment.

It may be seen that a constraint boundary C determined based on the designated obstacle does not participate in enclosing of the constraint set. For the target device, compared with the designated obstacle B, a predicted trajectory point at which the designated obstacle C is located is located at a relatively outside position. Therefore, a constraint set enclosed by the constraint boundary A, the constraint boundary B, the constraint boundary D, and the constraint boundary E is a subset of a constraint set enclosed by the constraint boundary A, the constraint boundary C, the constraint boundary D, and the constraint boundary E.

To avoid obtaining a solution of a constraint boundary that does not participate in enclosing of the constraint set from wasting computing resources, this disclosure provides the following manner as an example. Determining corresponding constraint boundaries for all the designated obstacles through constructing a taboo list including the designated obstacle further includes:

determining a taboo list, and initializing the taboo list to an empty set; using, for each designated obstacle, the designated obstacle as a target obstacle and determining whether the target obstacle is in the taboo list; if yes, reselecting a designated obstacle as the target obstacle until all the designated obstacles are included in the taboo list; and if not, determining the constraint boundary corresponding to the target obstacle based on the velocity of the target obstacle and the velocity of the target device, adding, based on the constraint boundary corresponding to the target obstacle, one or more designated obstacles that are not located in a same space as the target device into the taboo list, and reselecting a designated obstacle as the target obstacle.

It can be seen that when a constraint boundary determined for a designated obstacle that serves as a target obstacle earlier divides a designated obstacle that serves as a target obstacle later and the target device into different disjoint spaces, the designated obstacle that serves as a target obstacle later (that is, the potential latter target obstacle) is added into the taboo list, to avoid from being used as a target obstacle and having a constraint boundary determined therefor.

Still using FIG. 3 as an example, when the designated obstacle B is determined as a target obstacle earlier than the designated obstacle C, the constraint boundary B determined for the designated obstacle B may divide the designated obstacle C and the target device into different disjoint spaces. In this case, the designated obstacle B and the designated obstacle C are added into the taboo list. Subsequently, when the designated obstacle C is used as the target obstacle, a target obstacle is redetermined because the designated obstacle C is in the taboo list, to avoid the waste of computing resources caused by determining the constraint boundary C for the designated obstacle C.

Further, the foregoing manner can implement the effect only when a designated obstacle closer to the target device is used as a target obstacle earlier than a designated obstacle further from the target device. Based on this, the embodiments of this disclosure further provide a manner of determining a target obstacle from designated obstacles in order according to distances from the target device. Specifically, the distances between the designated obstacles and the target device are determined based on the preliminary reference trajectory point of the target device and the predicted trajectory points of the designated obstacles; and the designated obstacles are sorted based on the distances between the designated obstacles and the target device in ascending order, and the target obstacle is selected from the designated obstacles in order. It can be seen that in the embodiment shown in FIG. 3, the designated obstacle B is selected as the target obstacle earlier than the designated obstacle C, to avoid the waste of computing resource caused by determining the constraint boundary C for the designated obstacle C.

S106: Adjust a preliminary reference trajectory of the target device under the constraint of the constraint set of the target moment, and determine the adjusted preliminary reference trajectory as a reference trajectory of the target device.

Specifically, for each future moment serving as the target moment, the preliminary reference trajectory point of the target device at the future moment is determined under the constraint of the corresponding constraint set determined in the foregoing manners for the future moment, and the adjusted preliminary reference trajectory is used as the reference trajectory point of the target device at the future moment. The reference trajectory is formed by the reference trajectory points at the future moments.

In one embodiment, any existing optimization algorithm, for example, the gradient descent algorithm, may be used to optimize the preliminary reference trajectory point of the target device under the constraint of the corresponding constraint set. During optimization of the preliminary reference trajectory point, in addition to the optimization objective of avoiding designated obstacles, there are other optimization objectives, for example, slowing down when the red light is received, which is not limited in this disclosure.

It should be noted that in an embodiment in accordance with this disclosure, for each future moment, after a reference trajectory point of the unmanned vehicle at the future moment is determined under the constraint of a constraint set corresponding to the future moment, a preliminary reference trajectory point may be further determined for a next future moment based on the determined reference trajectory point of the unmanned vehicle at the future moment, and the reference trajectory point are determined for the unmanned vehicle at the next future moment in the foregoing manners.

Based on the method in FIG. 1, in the embodiments in accordance with this disclosure, a constraint set of a space including the target device is determined according to a velocity of the target device and a velocity of the designated obstacle, so that during optimization of a preliminary reference trajectory, a solution can be obtained with the space in the constraint set as a solution space under the constraint of the constraint set, so as to ensure that the solution space is a convex space, and relatively satisfactory reference trajectory points can be solved.

In addition, when the target device is the unmanned vehicle, the constraint sets of the unmanned vehicle at the target moments are generally limited to the location of the road, to avoid the reference trajectory points solved for the unmanned vehicle from being located outside the road. Based on this, if a two-dimensional space formed by the area of the road is a non-convex space, the coordinates of the unmanned vehicle and the designated obstacles need to be converted into coordinates in a road coordinate system, to convert the solution space into a convex space. The coordinates of the unmanned vehicle and the designated obstacles can be converted in any existing manner, which is not limited in this disclosure.

Figure 4:
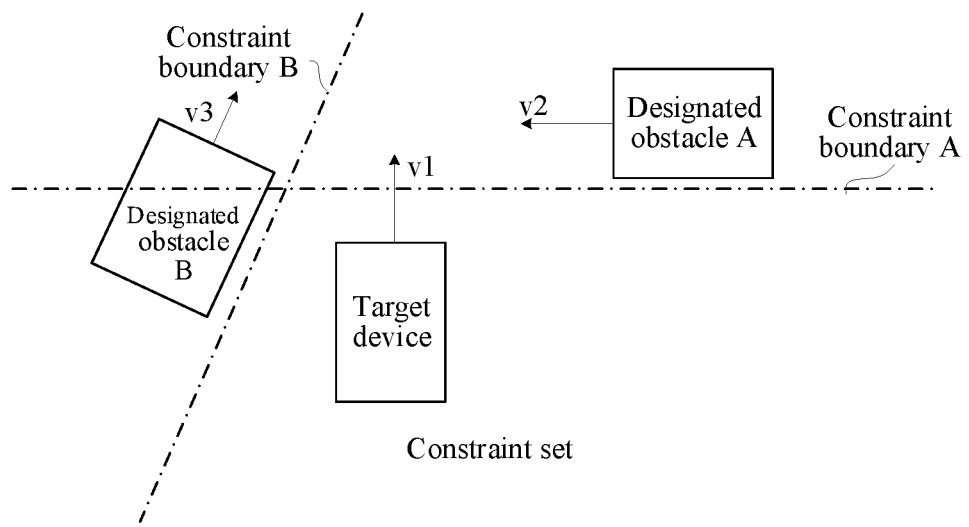
FIG. 4 is a schematic diagram of another constraint set according to this disclosure.

When a constraint set is determined for the unmanned vehicle, the constraint set determined for the unmanned vehicle has a relatively large range because there are few designated obstacles around the unmanned vehicle, or the designated obstacles are too concentrated. For example, in an extreme case, there is no obstacles around the unmanned vehicle based on detection results of the unmanned vehicle, and the constraint set of the unmanned vehicle is a whole two-dimensional plane. In another example, as shown in FIG. 4, the constraint set determined based on the constraint boundaries corresponding to the designated obstacles has no boundary. Under the constraint of an excessively large constraint set, it is difficult to solve the reference trajectory points of the unmanned aerial vehicle.

In the embodiments in accordance with this disclosure, before constraint boundaries corresponding to the designated obstacles are determined, a space including the target device, centered around the preliminary reference trajectory point of the target device, and enclosed by the initial constraint boundaries is pre-determined as an initial constraint set for the unmanned vehicle. After the constraint boundaries corresponding to the designated obstacles are determined, a constraint boundary corresponding to the target moment is based on at least some of the initial constraint boundaries and the constraint boundaries. That is to say, the largest range of the constraint boundary of the unmanned vehicle at the target moment is the initial constraint boundary for a target moment.

Figure 5A:
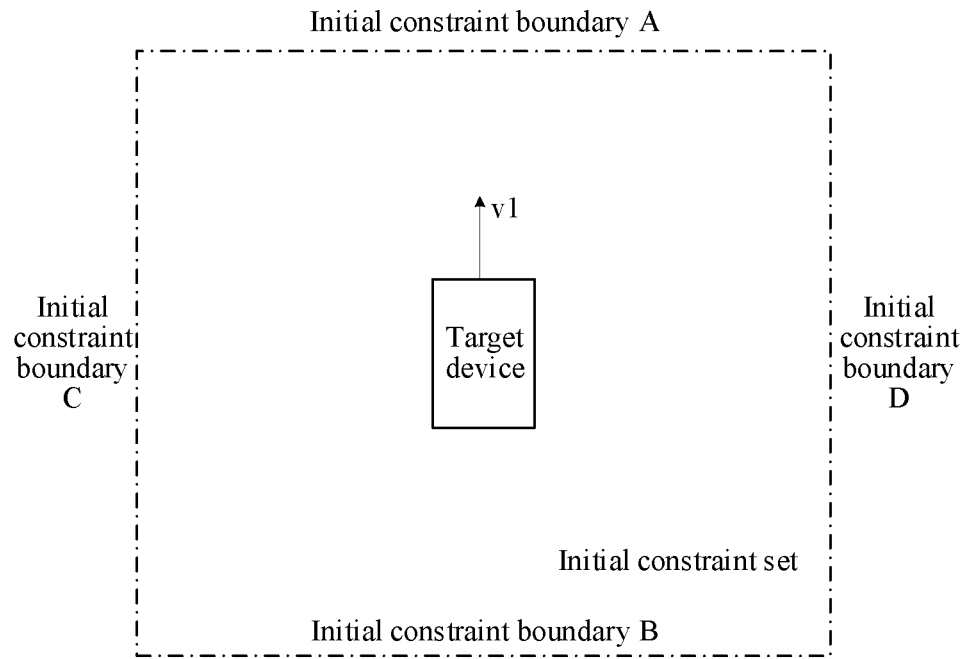
FIG. 5A is a schematic diagram of an initial constraint set according to this disclosure.
Figure 5B:
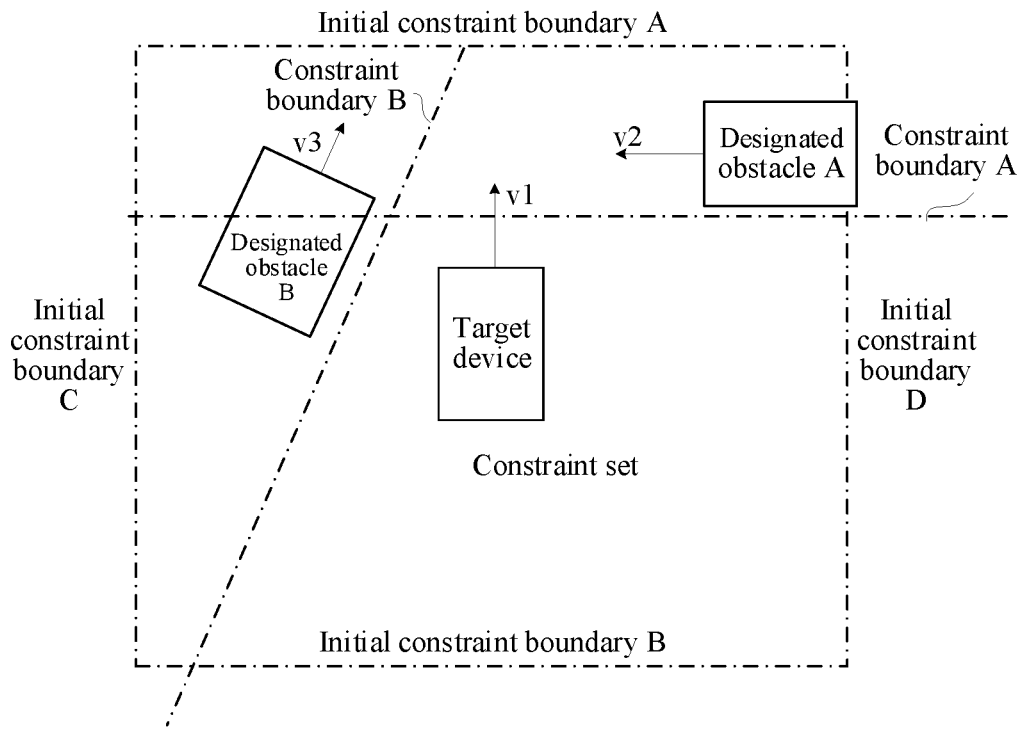
FIG. 5B is a schematic diagram of still another constraint set according to this disclosure.

For example, as shown in FIG. 5A, an initial constraint set enclosed by an initial constraint boundary A to an initial constraint boundary D is pre-determined for the unmanned vehicle in FIG. 5A. When the unmanned vehicle has no designated obstacle around, the constraint set at this target moment of the unmanned vehicle is the initial constraint set. Further, shown in FIG. 5B, when the unmanned vehicle has a designated obstacle A and a designated obstacle B around, a corresponding constraint boundary A and a corresponding constraint boundary B may be respectively determined for the designated obstacle A and the designated obstacle B in the foregoing manners. It can be seen that at the target moment, a constraint set, as shown in FIG. 5B, enclosed by the initial constraint boundary B, the initial constraint boundary D, the constraint boundary A, and the constraint boundary B can be determined for the unmanned vehicle.

The above is only an exemplary manner for adjusting a constraint boundary provided in this disclosure, and any other manner may be applied to adjusting the constraint boundary that overlaps the area of the unmanned vehicle, which is not limited in this disclosure.

In addition, the constraint sets of the designated obstacles may be determined based on the volume of the unmanned vehicle and the volumes of the designated obstacles. In the embodiments of this disclosure, expansion processing may be performed on the designated obstacles in advance, and the corresponding constraint boundaries are determined in any one of the foregoing manners based on expanded volumes of the designated obstacles after the expansion. This disclosure provides a method for expanding a volume of a designated obstacle, including:

determining, for each future moment, an expansion coefficient of each designated obstacle based on a predicted trajectory of the designated obstacle and a preliminary reference trajectory of a target device, where the greater a probability that the designated obstacle and the target device are located at the same position at the same time, the greater the determined expansion coefficient of the designated obstacle; and determining an expanded volume of the designated obstacle after expansion based on the expansion coefficient of the designated obstacle and an initial volume of the designated obstacle.

In one embodiment, in an actual application, distances between the designated obstacles around the unmanned vehicle and the unmanned vehicle are not fixed. It should be understood that at each future moment, a designated obstacle closer to the unmanned vehicle has a larger possibility of colliding with the unmanned vehicle. For a designated obstacle with a larger possibility of colliding with the unmanned vehicle, in the embodiments of this disclosure, a larger volume may be expanded for the designated obstacle with a larger expansion coefficient, so that when a trajectory is planned with a goal of avoiding the designated obstacle, a larger space is reserved between the unmanned vehicle and the designated obstacle with a larger volume after expansion, to avoid collisions to a greater extent.

On the other than, for a designated obstacle with a smaller possibility of colliding with the unmanned vehicle, the designated obstacle may be expanded with a small expansion coefficient, and the designated obstacle with a smaller volume after expansion can be obtained. The expanded volume of the designated obstacle is greater than the initial volume before expansion. In this way, that a region in which the unmanned vehicle can travel is relatively small during trajectory planning due to avoiding the designated obstacle is avoided.

Specifically, a target predicted trajectory point describing the probability distribution of the position of the designated obstacle at the future moment can be pre-determined, and a probability that the unmanned vehicle and the designated obstacle are at the same position at the same time can be determined directly based on the number of intersections between the target predicted trajectory of the designated obstacle and the preliminary reference trajectory of the unmanned vehicle. Alternatively, for each future moment and for each designated obstacle at the future moment, a probability of collision between the designated obstacle and the unmanned vehicle at the future moment can determined based on the target predicted trajectory point of the designated obstacle at the future moment and the preliminary reference trajectory point of the unmanned vehicle at the future moment, so as to determine an expansion coefficient of the designated obstacle at the future moment. It can be seen that for each designated obstacles, an expansion coefficient of the designated obstacle at a future moments is determined based on a probability that the designated obstacle collides with the unmanned vehicle at the future moment, that is, expansion coefficients of the designated obstacle at several future moments may not be the same. The greater the probability that the designated obstacle collide with the target device, the greater the expansion coefficient determined for the designated obstacle at the future moment, and the greater the expanded volume of the designated obstacle after expansion at the future moment.

In addition, in the embodiments of this disclosure, when there is a high degree of certainty that the unmanned vehicle will not collide with a designated obstacle at a future moment, the designated obstacle may be used as a safety obstacle at the future moment. In the subsequent planning of a reference trajectory point for the unmanned vehicle at this future moment, the safety obstacle is not taken into consideration, and certainly, there is no need to expand the safety obstacle. The safety obstacle may be determined from the designated obstacles in any manner, which is not limited in this disclosure.

Generally, when the target device is an unmanned vehicle, it can be considered that the unmanned vehicle moves on a two-dimensional plane, that is, a road. Therefore, it can only be determined whether the unmanned vehicle and the designated obstacle are at the same position based on projected shapes of the unmanned vehicle and the designated obstacle on the two-dimensional plane. Specifically, at each future moment, when any point on the projected shape of the unmanned vehicle coincides with any point on the projected shape of the designated obstacle, it can be considered that the unmanned vehicle is at the same position as the designated obstacle at the same time.

Figure 6:
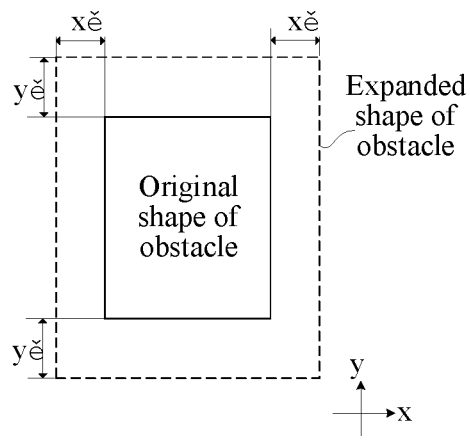
FIG. 6 is a schematic diagram of expansion of a designated obstacle according to this disclosure.

Similarly, when a designated obstacle is expanded, only the shape of the designated obstacle can be expanded without expanding the designated obstacle in the height direction. In this case, the shape of the designated obstacle before expansion can be used as the initial shape of the designated obstacle, and the expanded shape of the designated obstacle is used as the expanded shape of the designated obstacle. For example, FIG. 6 shows a method for expanding a shape of a designated obstacle through this expansion method. Specifically, a Cartesian coordinate system can be established for the designated obstacle, and an expanded distance x' of the designated obstacle in the x-axis direction and an expanded distance y' of the designated obstacle in the y-axis direction are determined based on the expansion coefficient of the designated obstacle. Subsequently, the original shape of the designated obstacle indicated by solid lines in a direction x is expanded by x' respectively to the positive and negative directions of the x-axis, and the original shape of the designated obstacle in a direction y is expanded by y' respectively expanded to the positive and negative directions of the y-axis, and an expanded shape of the designated obstacle indicated in dashed lines after expansion is obtained.

As described above, based on the expansion direction predetermined for the designated obstacle, any existing algorithm can be used to determine the expanded distance of the designated obstacle in each expansion direction, and the determined expanded distance is used to expand the initial shape of the designated obstacle in the corresponding expanded distance. In each expansion direction, an expanded distance in the expansion direction determined based on the expansion coefficient is positively correlated with the expansion coefficient. It should be noted that the above is only an example of expanding a shape of a designated obstacle on a two-dimensional plane. In this disclosure, the expansion direction may include any direction in the three-dimensional space in which the target device moves, which is not limited in this disclosure.

The foregoing part of this disclosure exemplifies the method for trajectory planning provided in this disclosure by using as an example in which the target device is an unmanned vehicle. When the target device is another unmanned device, for example, an unmanned aerial vehicle, a planned reference trajectory can also be determined according to the method for trajectory planning provided in this disclosure. It only needs to replace the steps explained in this disclosure.

The foregoing describes a method for trajectory planning provided by one or more embodiments of this disclosure. Based on the same idea, this disclosure also provides a corresponding apparatus for trajectory planning, as shown in FIG. 7.

Figure 7:
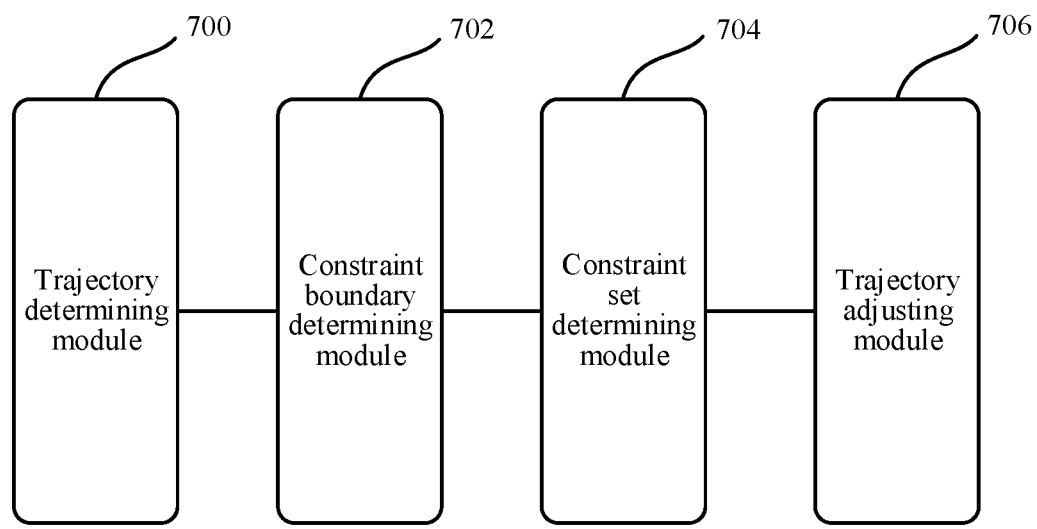
FIG. 7 is a schematic diagram of an apparatus for trajectory planning according to this disclosure.

FIG. 7 is a schematic diagram of an apparatus for trajectory planning according to this disclosure. The apparatus includes: a trajectory determining module 700, a constraint boundary determining module 702, a constraint set determining module 704 and a trajectory adjusting module 706.

The trajectory determining module 700 is configured to determine a preliminary reference trajectory point of a target device and predicted trajectory points of designated obstacles at a target moment.

The constraint boundary determining module 702 is configured to for each of the designated obstacles, determine a constraint boundary corresponding to the designated obstacle according to a velocity of the designated obstacle and a velocity of the target device, where the constraint boundary is configured to divide a space in which the target device and the designated obstacle are located into two disjoint parts, such that the designated obstacle is in one of the two disjoint parts and the target device is in another of the two disjoint parts.

The constraint set determining module 704 is configured to determine a space including the target device and enclosed by constraint boundaries corresponding to at least some of the designated obstacles as a constraint set corresponding to the target moment.

The trajectory adjusting module 706 is configured to adjust a preliminary reference trajectory of the target device under the constraint of the constraint set of the target moment, and use the adjusted preliminary reference trajectory as a reference trajectory of the target device.

In some embodiments, the trajectory determining module 700 is further configured to determine predicted trajectory points of obstacles, select obstacles meeting a first distance condition from the obstacles as the designated obstacles based on the preliminary reference trajectory point of the target device, where the obstacles meeting the first distance condition are of which distances between predicted trajectory points and the preliminary reference trajectory point of the target device are less than a predetermined first distance.

In some embodiments, before the determining a constraint boundary corresponding to each designated obstacle according to a velocity of the designated obstacle and a velocity of the target device, the constraint boundary determining module 702 is further configured to: determine, based on the preliminary reference trajectory point of the target device, a space including the target device, enclosed by initial constraint boundaries, and centered around the preliminary reference trajectory point of the target device as an initial constraint set. The constraint set determining module 704 is further configured to determine a space including the target device and enclosed by at least some of the initial constraint boundaries and the constraint boundaries corresponding to the designated obstacles, and use the space as a constraint set corresponding to the target moment.

In some embodiments, the constraint boundary determining module 702 is further configured to determine a relative velocity between the designated obstacle and the target device based on the velocity of the designated obstacle and velocity of the target device; determine whether a distance between the designated obstacle and the target device has a decreasing trend under the action of the relative velocity between the designated obstacle and the target device; if yes, determine hyperplanes each with a normal vector perpendicular to the velocity direction of the designated obstacle as candidate hyperplanes corresponding to the designated obstacle; and select a constraint boundary corresponding to the designated obstacle from the candidate hyperplanes corresponding to the designated obstacle; and if not, determine hyperplanes each with a normal vector perpendicular to the velocity direction of the target device as candidate hyperplanes corresponding to the designated obstacle; and select a constraint boundary corresponding to the designated obstacle from the candidate hyperplanes corresponding to the designated obstacle.

In some embodiments, the constraint boundary determining module 702 is further configured to determine, for each candidate hyperplane corresponding to the designated obstacle, a distance between the candidate hyperplane and the preliminary reference trajectory point of the target device based on the preliminary reference trajectory point of the target device; and select, from all the candidate hyperplanes corresponding to the designated obstacle, a candidate hyperplane that has a longest distance to the preliminary reference trajectory point of the target device as the constraint boundary corresponding to the designated obstacle.

In some embodiments, after the determining predicted trajectory points of designated obstacles at a target moment, the constraint boundary determining module 702 is further configured to determine a taboo list, and initialize the taboo list to an empty set; and the determining a constraint boundary corresponding to each designated obstacle according to a velocity of the designated obstacle and a velocity of the target device includes: using, for each designated obstacle, the designated obstacle as a target obstacle and determining whether the target obstacle is in the taboo list; in response to determining that the target obstacle is in the taboo list, reselecting a designated obstacle as the target obstacle until all the designated obstacles are included in the taboo list; and in response to determining that the target obstacle is not in the taboo list, determining the constraint boundary corresponding to the target obstacle based on the velocity of the target obstacle and the velocity of the target device, adding, based on the constraint boundary corresponding to the target obstacle, one or more designated obstacles that are not located in a same space as the target device into the taboo list, and reselecting a designated obstacle as the target obstacle.

In some embodiments, the constraint boundary determining module 702 is specifically configured determine distances between the designated obstacles and the target device based on the preliminary reference trajectory point of the target device and the predicted trajectory points of the designated obstacles; and sort the designated obstacles according to the distances between the designated obstacles and the target device in ascending order, and selecting a target obstacle from the designated obstacles in order.

In some embodiments, the trajectory adjusting module 706 is further configured to use, for each future moment, the future moment as the target moment, and determine the preliminary reference trajectory point of the target device and the predicted trajectory points of the designated obstacles at the target moment; adjust, for each future moment, the preliminary reference trajectory point of the target device at the future moment under the constraint of a constraint set corresponding to the future moment, and using the adjusted preliminary reference trajectory point as a reference trajectory point of the target device at the future moment; and determine a reference trajectory of the target device based on reference trajectory points of the target device at future moments.

This disclosure further provides a computer-readable storage medium, storing a computer program. The computer program can be configured to perform the method for trajectory planning provided in FIG. 1.

Figure 8:
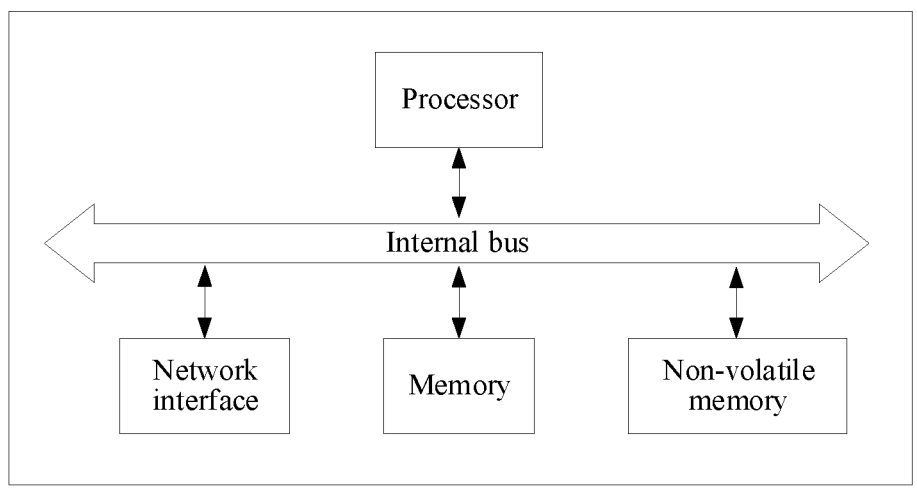
FIG. 8 is a schematic structural diagram of an unmanned device corresponding to FIG. 1 according to this disclosure.

This disclosure further provides a schematic structural diagram of an unmanned device shown in FIG. 8. As shown in FIG. 8, at the hardware level, the unmanned device includes a processor, an internal bus, a memory, and a non-volatile memory, and certainly, may further include hardware required for other services. The processor reads a corresponding computer program from the non-volatile memory into the memory and then runs the computer program, to implement the method for trajectory planning provided in FIG. 1.

Definitely, in addition to a software implementation, this disclosure does not exclude other implementations, for example, a logic device or a combination of software and hardware. In other words, an entity executing the following processing procedure is not limited to the logic units, and may also be hardware or logic devices.

In the 1990s, improvements in a technology can be clearly categorized as hardware improvements (for example, improvements to a circuit structure such as a diode, a transistor, a switch, etc.) and software improvements (improvements to a method procedure). However, with the development of technology, improvements of many method procedures can be considered as direct improvements of hardware circuit structures. Designers almost all program an improved method procedure to a hardware circuit, to obtain a corresponding hardware circuit structure. Therefore, it does not mean that the improvement of a method procedure cannot be implemented by using a hardware entity module. For example, a programmable logic device (PLD) such as a field programmable gate array (FPGA) is a type of integrated circuit whose logic function is determined by a user by programming the device. The designers perform voluntary programming to "integrate" a digital system into a single PLD without requiring a chip manufacturer to design and prepare a dedicated integrated circuit chip. In addition, instead of making an integrated circuit chip manually, the programming is mostly implemented by using "logic compiler" software, which is similar to the software compiler used to write programs. Original code before compiling is also written in a specific programming language, which is referred to as Hardware Description Language (HDL). There are many types of HDLs, such as Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, Ruby Hardware Description Language (RHDL), etc. Currently, Very-High-Speed Integrated Circuit Hardware Description Language (VHDL) and Verilog are most commonly used. A person skilled in the art should also understand that as long as a method procedure is logically programmed and then programmed to an integrated circuit by using the foregoing hardware description languages, a hardware circuit that implements the logical method procedure can be easily obtained.

The controller can be implemented in any suitable manner. For example, the controller can use the form of, for example, a microprocessor or processor and a computer-readable medium storing computer-readable program code (for example, software or firmware) executable by the processor, a logic gate, a switch, an application-specific integrated circuit (ASIC), a programmable logic controller, and an embedded microcontroller. Examples of the controller include, but are not limited to, the following microcontrollers: ARC 625D, Atmel AT91SAM, Microchip PIC18F26K20, and Silicone Labs C8051F320. The memory controller can also be implemented as part of the memory control logic. A person skilled in the art will also appreciate that, in addition to implementing, by logically programming the method steps, the controller in the form of pure computer-readable program code, it is also possible to implement the controller in the form of a logic gate, switch, application-specific integrated circuit, programmable logic controller, and embedded microcontroller and other forms to achieve the same function. Such a controller can thus be considered as a hardware component and apparatuses included therein for implementing various functions can also be considered as structures inside the hardware component. Alternatively, apparatuses configured to implement various functions can be considered as both software modules implementing the method and structures inside the hardware component.

The system, the apparatus, the module or the unit described in the foregoing embodiments may be specifically implemented by a computer chip or an entity, or implemented by a product having a certain function. A typical implementation device is a computer. The computer can be, for example, a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, when the apparatus is described, the apparatus is divided into units according to functions, which are separately described. Certainly, during implementation of this disclosure, the functions of the units may be implemented in the same piece of or a plurality of pieces of software and/or hardware.

A person skilled in the art should understand that the embodiments of the present invention may be provided as a method, a system, or a computer program product. Therefore, the present invention may use a form of hardware-only embodiments, software-only embodiments, or embodiments with a combination of software and hardware. Moreover, the present invention may use a form of a computer program product that is implemented on one or more computer-usable storage media (including but not limited to a disk memory, a compact disc read-only memory (CD-ROM), an optical memory, and the like) that include computer-usable program code.

The present invention is described with reference to the flowcharts and/or block diagrams of the method, the device (system), and the computer program product according to the embodiments of the present invention. It should be understood that computer program instructions can implement each procedure and/or block in the flowcharts and/or block diagrams and a combination of procedures and/or blocks in the flowcharts and/or block diagrams. These computer program instructions may be provided to a general-purpose computer, a special-purpose computer, an embedded processor, or a processor of another programmable data processing device to generate a machine, so that an apparatus configured to implement functions specified in one or more procedures in the flowcharts and/or one or more blocks in the block diagrams is generated by using instructions executed by the computer or the processor of another programmable data processing device.

These computer program instructions may alternatively be stored in a computer-readable memory that can instruct a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

These computer program instructions may further be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, the computing device includes one or more processors (CPUs), an input/output interface, a network interface, and a memory.

The memory may include a form such as a volatile memory, a random access memory (RAM), and/or a non-volatile memory such as a read-only memory (ROM) or a flash memory (flash RAM) in a computer-readable medium. The memory is an example of the computer-readable medium.

The computer-readable medium includes a non-volatile medium and a volatile medium, a removable medium and a non-removable medium, which may implement storage of information by using any method or technology. The information may be a computer-readable instruction, a data structure, a program module, or other data. Examples of a computer storage medium include but are not limited to a phase-change memory (PRAM), a static random access memory (SRAM), a dynamic random access memory (DRAM), other type of random access memory (RAM), a read-only memory (ROM), an electrically erasable programmable read-only memory (EEPROM), a flash memory or other memory technology, a compact disc read-only memory (CD-ROM), a digital versatile disc (DVD) or other optical storage, a cassette tape, a magnetic tape, a magnetic disk storage or other magnetic storage device, or any other non-transmission medium, which may be configured to store information accessible by a computing device. As defined herein, a computer-readable medium does not include a transitory computer-readable medium such as modulated data signals and carriers.

It should be further noted that the terms "comprise", "include", or any variants thereof are intended to cover a non-exclusive inclusion. Therefore, a process, method, article, or device that includes a series of elements not only includes such elements, but also includes other elements not specified expressly, or may include inherent elements of the process, method, article, or device. Unless otherwise specified, an element limited by "include a/an . . . " does not exclude other same elements existing in the process, the method, the article, or the device that includes the element.

A person skilled in the art should understand that the embodiments of this disclosure may be provided as a method, a system, or a computer program product. This description may use the form of an entirely hardware embodiment, an entirely software embodiment, or an embodiment combining software and hardware aspects.

Moreover, this disclosure may use a form of a computer program product that is implemented on one or more computer-usable storage media (including but not limited to a disk memory, a CD-ROM, an optical memory, and the like) that include computer-usable program code.

This disclosure can be described in the general context of computer-executable instructions executed by a computer, for example, program modules. Generally, the program module includes a routine, a program, an object, a component, a data structure, and the like for executing a particular task or implementing a particular abstract data type. This disclosure may also be implemented in a distributed computing environment in which tasks are performed by remote processing devices connected by using a communication network. In a distributed computing environment, the program module may be located in both local and remote computer storage media including storage devices.

The embodiments of this disclosure are all described in a progressive manner, for same or similar parts in the embodiments, refer to these embodiments, and descriptions of each embodiment focus on a difference from other embodiments. Especially, a system embodiment is basically similar to a method embodiment, and therefore is described briefly; for related parts, reference may be made to partial descriptions in the method embodiment.

The descriptions are merely embodiments of this disclosure, and are not intended to limit this disclosure. For a person skilled in the art, various modifications and changes may be made to this disclosure. Any modification, equivalent replacement, and improvement made within the spirit and principle of this disclosure shall fall within the scope of the claims of this disclosure.

The invention claimed is:

1. A method for trajectory planning, comprising:
   determining a preliminary reference trajectory point of a target device and predicted trajectory points of designated obstacles at a target moment;
   for each of the designated obstacles, determining a constraint boundary corresponding to the designated obstacle according to a velocity of the designated obstacle and a velocity of the target device, wherein the constraint boundary is configured to divide a space in which the target device and the designated obstacle are located into two disjoint parts, such that the designated obstacle is in one of the two disjoint parts and the target device is in another of the two disjoint parts;
   determining a space comprising the target device and enclosed by constraint boundaries corresponding to at least some of the designated obstacles as a constraint set corresponding to the target moment; and
   adjusting a preliminary reference trajectory of the target device under the constraint of the constraint set of the target moment, and determining the adjusted preliminary reference trajectory as a reference trajectory of the target device, wherein determining the constraint boundary corresponding to the designated obstacle according to the velocity of the designated obstacle and the velocity of the target device comprises:
   determining a relative velocity between the designated obstacle and the target device based on the velocity of the designated obstacle and velocity of the target device;
   determining whether a distance between the designated obstacle and the target device has a decreasing trend under an effect of the relative velocity between the designated obstacle and the target device;
   in response to determining that the distance between the designated obstacle and the target device has a decreasing trend,
   determining hyperplanes each with a normal vector perpendicular to a velocity direction of the designated obstacle as candidate hyperplanes corresponding to the designated obstacle; and
   selecting a constraint boundary corresponding to the designated obstacle from the candidate hyperplanes corresponding to the designated obstacle; and
   in response to determining that the distance between the designated obstacle and the target device has an increasing trend,
   determining hyperplanes each with a normal vector perpendicular to the velocity direction of the target device as candidate hyperplanes corresponding to the designated obstacle; and
   selecting a constraint boundary corresponding to the designated obstacle from the candidate hyperplanes corresponding to the designated obstacle controlling vehicle to the updated trajectory.

2. The method according to claim 1, wherein before determining predicted trajectory points of the designated obstacles, the method further comprises:
   determining predicted trajectory points of obstacles; and
   selecting obstacles meeting a first distance condition from the obstacles as the designated obstacles based on the preliminary reference trajectory point of the target device, wherein for each of the obstacles meeting the first distance condition, a distance between the predicted trajectory point of the obstacle and the preliminary reference trajectory point of the target device is less than a predetermined first distance.

3. The method according to claim 1, wherein before for each of the designated obstacles, determining the constraint boundary corresponding to the designated obstacle according to the velocity of the designated obstacle and the velocity of the target device, the method further comprises:
   determining, based on the preliminary reference trajectory point of the target device, a space comprising the target device, enclosed by initial constraint boundaries, and centered around the preliminary reference trajectory point of the target device as an initial constraint set; and
   determining the space comprising the target device and enclosed by constraint boundaries corresponding to at least some of the designated obstacles as the constraint set corresponding to the target moment comprises:
   determining a space comprising the target device and enclosed by at least some of the initial constraint boundaries and the constraint boundaries corresponding to the designated obstacles as a constraint set corresponding to the target moment.

4. The method according to claim 1, wherein selecting the constraint boundary corresponding to the designated obstacle from the candidate hyperplanes corresponding to the designated obstacle comprises:
   for each of the candidate hyperplanes corresponding to the designated obstacle, determining a distance between the candidate hyperplane and the preliminary reference trajectory point of the target device based on the preliminary reference trajectory point of the target device; and
   selecting, from the candidate hyperplanes corresponding to the designated obstacle, a candidate hyperplane with a longest distance to the preliminary reference trajectory point of the target device as the constraint boundary corresponding to the designated obstacle.

5. The method according to claim 1, wherein after determining the predicted trajectory points of the designated obstacles at the target moment, the method further comprises:

determining a taboo list, and initializing the taboo list to an empty set; and for each of the designated obstacles, determining the constraint boundary corresponding to the designated obstacle according to the velocity of the designated obstacle and the velocity of the target device comprises:

for each of the designated obstacles, determining the designated obstacle as a target obstacle and determining whether the target obstacle is in the taboo list;

in response to determining that the target obstacle is in the taboo list, reselecting one of the designated obstacles as the target obstacle until all the designated obstacles are comprised in the taboo list; and in response to determining that the target obstacle is not in the taboo list, determining the constraint boundary corresponding to the target obstacle based on the velocity of the target obstacle and the velocity of the target device, adding, based on the constraint boundary corresponding to the target obstacle, one or more of the designated obstacles that are not located in the another of the two disjoint parts, into the taboo list, and reselecting one of the designated obstacles as the target obstacle.

6. The method according to claim 5, wherein for each of the designated obstacles, determining the designated obstacle as the target obstacle comprises:

for each of the designated obstacles, determining a distance between the designated obstacle and the target device based on the preliminary reference trajectory point of the target device and the predicted trajectory point of the designated obstacle; and sorting the designated obstacles according to distances between the designated obstacles and the target device in ascending order, and selecting a target obstacle from the sorted designated obstacles in order.

7. The method according to claim 1, wherein determining the preliminary reference trajectory point of the target device and the predicted trajectory points of the designated obstacles at the target moment comprises:

for each future moment, determining the future moment as the target moment, and determining the preliminary reference trajectory point of the target device and the predicted trajectory points of the designated obstacles at the target moment; and adjusting the preliminary reference trajectory of the target device under the constraint of the constraint set of the target moment comprises:

for each future moment, adjusting the preliminary reference trajectory point of the target device at the future moment under the constraint of a constraint set corresponding to the future moment, and determining the adjusted preliminary reference trajectory point as a reference trajectory point of the target device at the future moment; and determining the reference trajectory of the target device based on reference trajectory points of the target device at future moments.

8. A non-transitory computer-readable storage medium, storing a computer program such that when the computer program is executed by a processor, the processor is caused to perform:

determining a preliminary reference trajectory point of a target device and predicted trajectory points of designated obstacles at a target moment;

for each of the designated obstacles, determining a constraint boundary corresponding to the designated obstacle according to a velocity of the designated obstacle and a velocity of the target device, wherein the constraint boundary is configured to divide a space in which the target device and the designated obstacle are located into two disjoint parts, such that the designated obstacle is in one of the two disjoint parts and the target device is in another of the two disjoint parts;

determining a space comprising the target device and enclosed by constraint boundaries corresponding to at least some of the designated obstacles as a constraint set corresponding to the target moment; and adjusting a preliminary reference trajectory of the target device under the constraint of the constraint set of the target moment, and determining the adjusted preliminary reference trajectory as a reference trajectory of the target device, wherein determining the constraint boundary corresponding to the designated obstacle according to the velocity of the designated obstacle and the velocity of the target device comprises:

determining a relative velocity between the designated obstacle and the target device based on the velocity of the designated obstacle and velocity of the target device;

determining whether a distance between the designated obstacle and the target device has a decreasing trend under an effect of the relative velocity between the designated obstacle and the target device;

in response to determining that the distance between the designated obstacle and the target device has a decreasing trend, determining hyperplanes each with a normal vector perpendicular to a velocity direction of the designated obstacle as candidate hyperplanes corresponding to the designated obstacle; and selecting a constraint boundary corresponding to the designated obstacle from the candidate hyperplanes corresponding to the designated obstacle; and in response to determining that the distance between the designated obstacle and the target device has an increasing trend, determining hyperplanes each with a normal vector perpendicular to the velocity direction of the target device as candidate hyperplanes corresponding to the designated obstacle; and selecting a constraint boundary corresponding to the designated obstacle from the candidate hyperplanes corresponding to the designated obstacle controlling vehicle to the updated trajectory.

9. An unmanned device, comprising a memory, a processor, and a computer program stored on the memory and executable on the processor, the processor, when executing the program, implementing operations:

determining a preliminary reference trajectory point of a target device and predicted trajectory points of designated obstacles at a target moment;

for each of the designated obstacles, determining a constraint boundary corresponding to the designated obstacle according to a velocity of the designated obstacle and a velocity of the target device, wherein the constraint boundary is configured to divide a space in which the target device and the designated obstacle are located into two disjoint parts, such that the designated obstacle is in one of the two disjoint parts and the target device is in another of the two disjoint parts;

determining a space comprising the target device and enclosed by constraint boundaries corresponding to at least some of the designated obstacles as a constraint set corresponding to the target moment; and adjusting a preliminary reference trajectory of the target device under the constraint of the constraint set of the target moment, and determining the adjusted preliminary reference trajectory as a reference trajectory of the target device, wherein determining the constraint boundary corresponding to the designated obstacle according to the velocity of the designated obstacle and the velocity of the target device comprises:

determining a relative velocity between the designated obstacle and the target device based on the velocity of the designated obstacle and velocity of the target device;

determining whether a distance between the designated obstacle and the target device has a decreasing trend under an effect of the relative velocity between the designated obstacle and the target device;

in response to determining that the distance between the designated obstacle and the target device has a decreasing trend, determining hyperplanes each with a normal vector perpendicular to a velocity direction of the designated obstacle as candidate hyperplanes corresponding to the designated obstacle; and selecting a constraint boundary corresponding to the designated obstacle from the candidate hyperplanes corresponding to the designated obstacle; and in response to determining that the distance between the designated obstacle and the target device has an increasing trend, determining hyperplanes each with a normal vector perpendicular to the velocity direction of the target device as candidate hyperplanes corresponding to the designated obstacle; and selecting a constraint boundary corresponding to the designated obstacle from the candidate hyperplanes corresponding to the designated obstacle controlling vehicle to the updated trajectory.

10. The unmanned device according to claim 9, wherein before determining predicted trajectory points of the designated obstacles, the operations further comprise:

determining predicted trajectory points of obstacles; and selecting obstacles meeting a first distance condition from the obstacles as the designated obstacles based on the preliminary reference trajectory point of the target device, wherein for each of the obstacles meeting the first distance condition, a distance between the predicted trajectory point of the obstacle and the preliminary reference trajectory point of the target device is less than a predetermined first distance.

11. The unmanned device according to claim 9, wherein before for each of the designated obstacles, determining the constraint boundary corresponding to the designated obstacle according to the velocity of the designated obstacle and the velocity of the target device, the operations further comprise:

determining, based on the preliminary reference trajectory point of the target device, a space comprising the target device, enclosed by initial constraint boundaries, and centered around the preliminary reference trajectory point of the target device as an initial constraint set; and determining the space comprising the target device and enclosed by constraint boundaries corresponding to at least some of the designated obstacles as the constraint set corresponding to the target moment comprises:

determining a space comprising the target device and enclosed by at least some of the initial constraint boundaries and the constraint boundaries corresponding to the designated obstacles as a constraint set corresponding to the target moment.

12. The unmanned device according to claim 9, wherein selecting the constraint boundary corresponding to the designated obstacle from the candidate hyperplanes corresponding to the designated obstacle comprises:

for each of the candidate hyperplanes corresponding to the designated obstacle, determining a distance between the candidate hyperplane and the preliminary reference trajectory point of the target device based on the preliminary reference trajectory point of the target device; and selecting, from the candidate hyperplanes corresponding to the designated obstacle, a candidate hyperplane with a longest distance to the preliminary reference trajectory point of the target device as the constraint boundary corresponding to the designated obstacle.

13. The unmanned device according to claim 9, wherein after determining the predicted trajectory points of the designated obstacles at the target moment, the operations further comprise:

determining a taboo list, and initializing the taboo list to an empty set; and for each of the designated obstacles, determining the constraint boundary corresponding to the designated obstacle according to the velocity of the designated obstacle and the velocity of the target device comprises:

for each of the designated obstacles, determining the designated obstacle as a target obstacle and determining whether the target obstacle is in the taboo list;

in response to determining that the target obstacle is in the taboo list, reselecting one of the designated obstacles as the target obstacle until all the designated obstacles are comprised in the taboo list; and in response to determining that the target obstacle is not in the taboo list, determining the constraint boundary corresponding to the target obstacle based on the velocity of the target obstacle and the velocity of the target device, adding, based on the constraint boundary corresponding to the target obstacle, one or more of the designated obstacles that are not located in the another of the two disjoint parts, into the taboo list, and reselecting one of the designated obstacles as the target obstacle.

14. The unmanned device according to claim 13, wherein for each of the designated obstacles, determining the designated obstacle as the target obstacle comprises:

for each of the designated obstacles, determining a distance between the designated obstacle and the target device based on the preliminary reference trajectory point of the target device and the predicted trajectory point of the designated obstacle; and sorting the designated obstacles according to distances between the designated obstacles and the target device in ascending order, and selecting a target obstacle from the sorted designated obstacles in order.

15. The unmanned device according to claim 9, wherein determining the preliminary reference trajectory point of the target device and the predicted trajectory points of the designated obstacles at the target moment comprises:
for each future moment, determining the future moment as the target moment, and determining the preliminary reference trajectory point of the target device and the predicted trajectory points of the designated obstacles at the target moment; and
adjusting the preliminary reference trajectory of the target device under the constraint of the constraint set of the target moment comprises:
for each future moment, adjusting the preliminary reference trajectory point of the target device at the future moment under the constraint of a constraint set corresponding to the future moment, and determining the adjusted preliminary reference trajectory point as a reference trajectory point of the target device at the future moment; and
determining the reference trajectory of the target device based on reference trajectory points of the target device at future moments.

* * * * *